Nov. 15, 1938.  O. SCHNECKO ET AL  2,136,566
METHOD FOR MAKING SAUSAGE CASINGS
Filed June 12, 1936  3 Sheets-Sheet 1
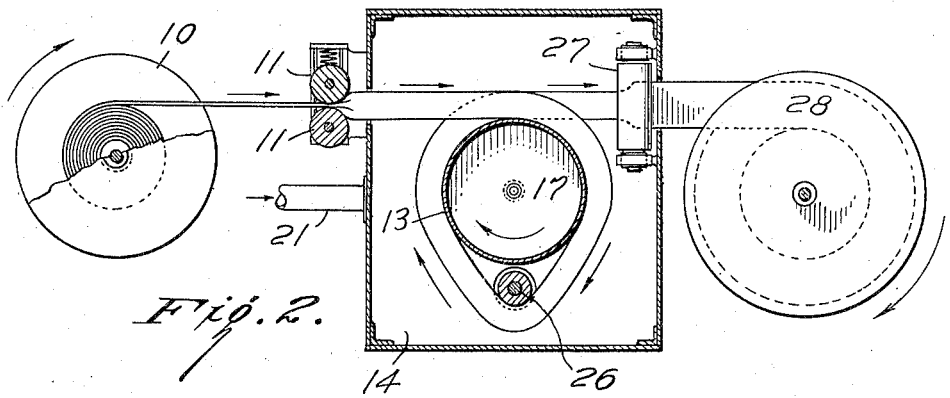
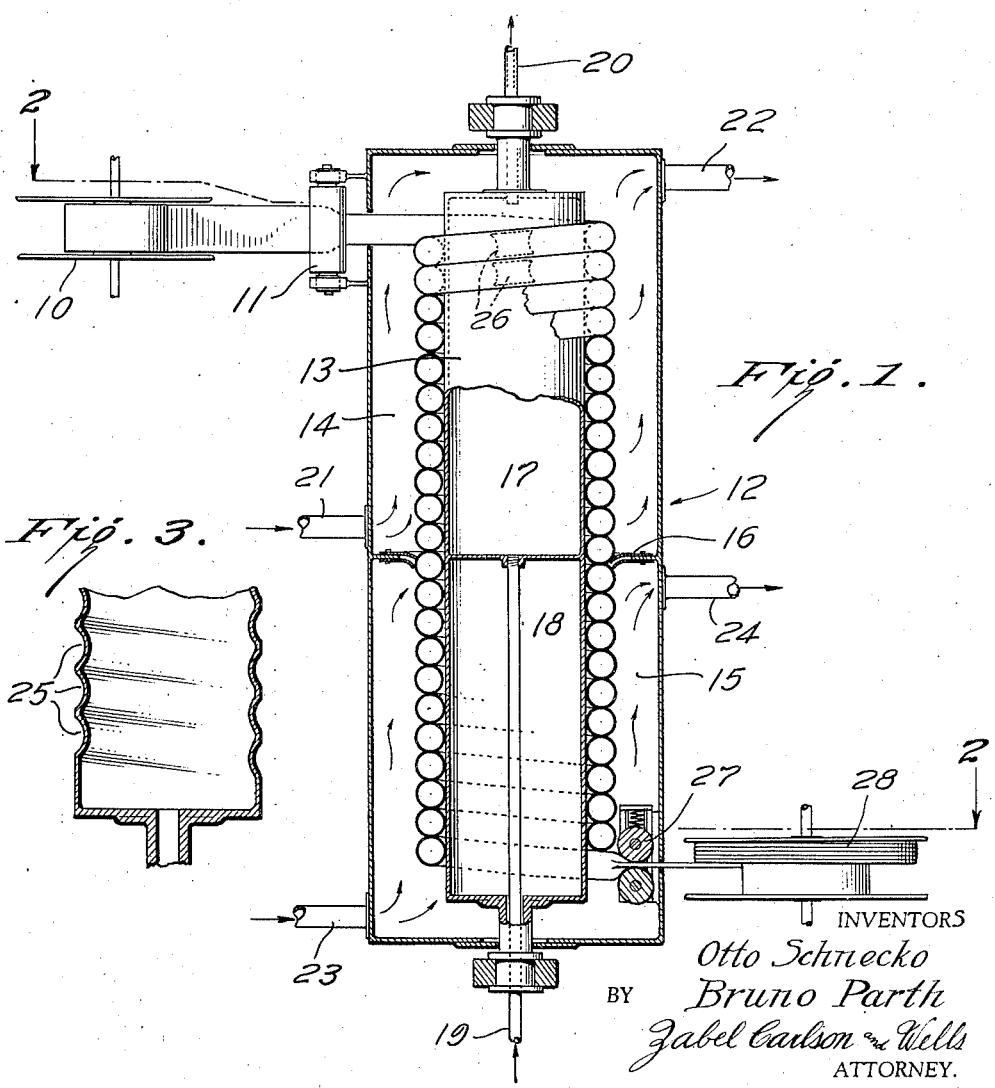
INVENTORS
Otto Schnecko
Bruno Parth
BY Zabel Carlson and Wells
ATTORNEY.

Nov. 15, 1938.      O. SCHNECKO ET AL      2,136,566
             METHOD FOR MAKING SAUSAGE CASINGS
                    Filed June 12, 1936          3 Sheets-Sheet 2
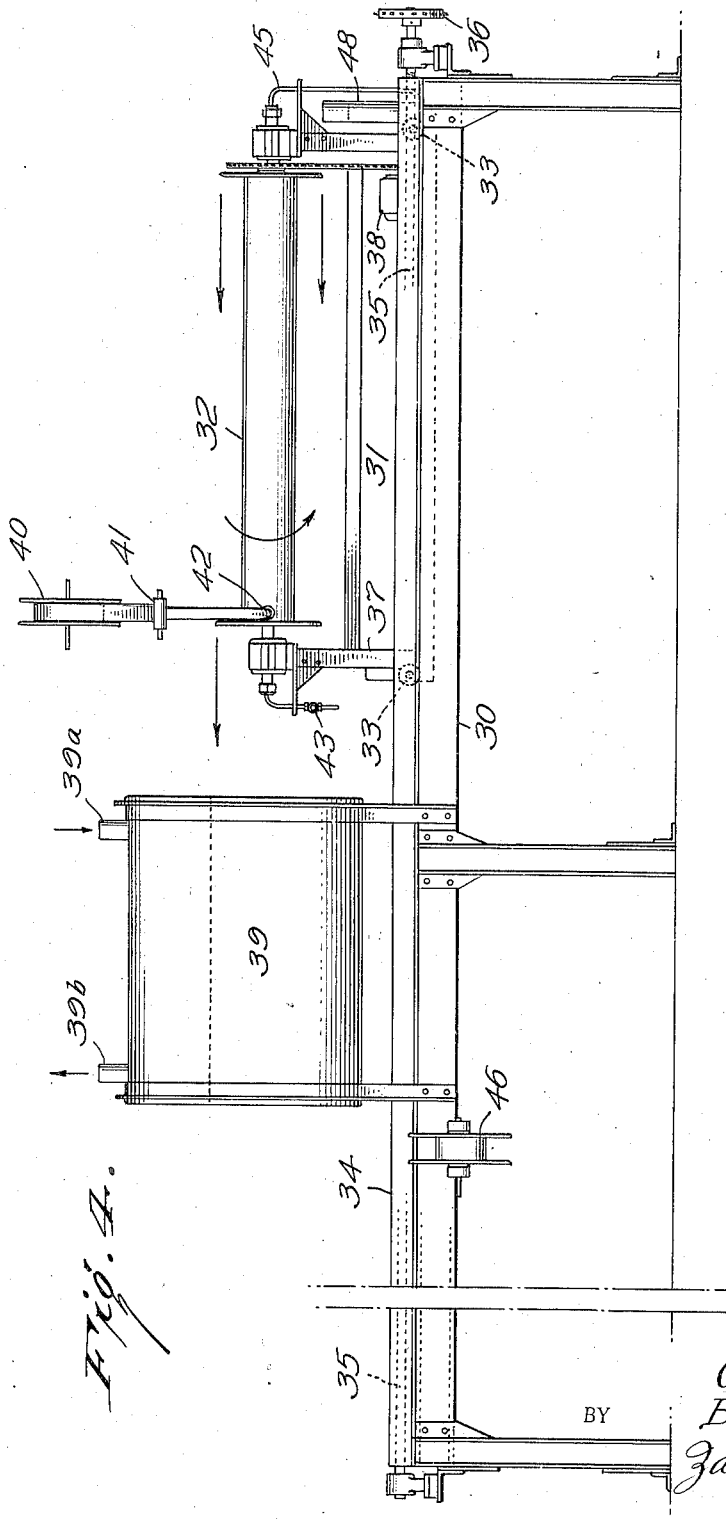
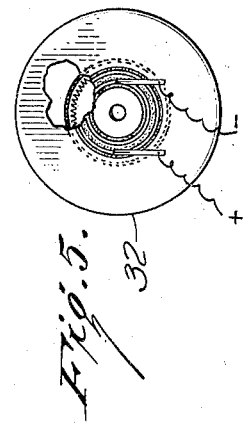
INVENTORS
Otto Schnecko
Bruno Parth
BY Zabel Carlson Wills
ATTORNEY.

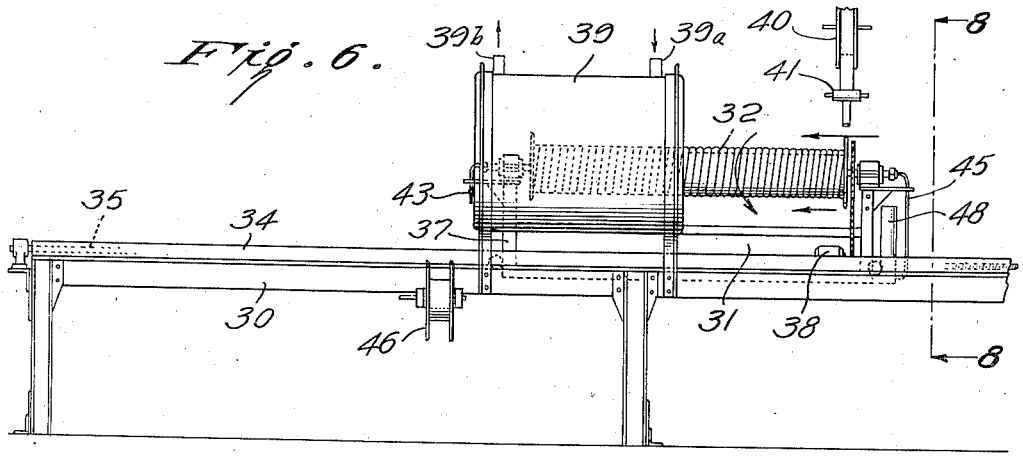
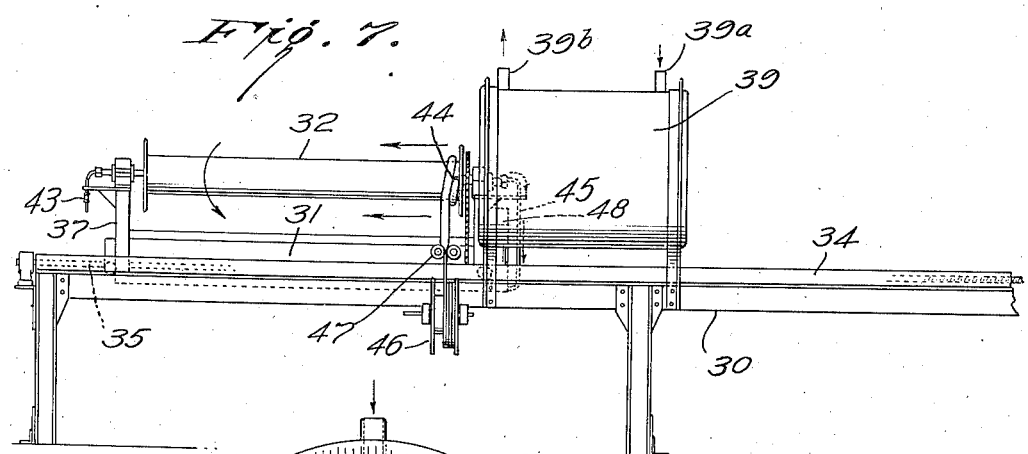
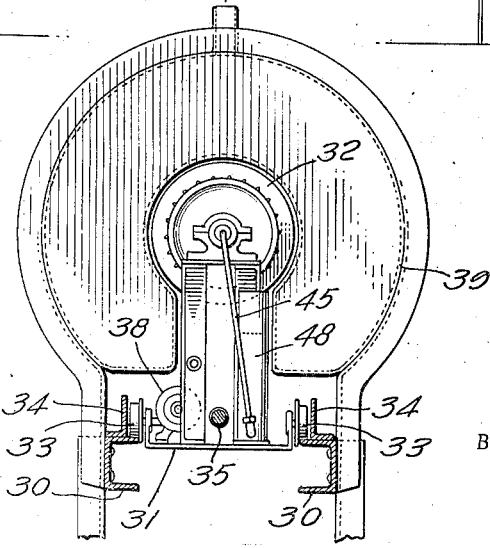

UNITED STATES PATENT OFFICE 2,136,566

METHOD FOR MAKING SAUSAGE CASINGS

Otto Schnecko and Bruno Parth, Wiesbaden-Biebrich, Germany, assignors to The Visking Corporation, Chicago, Ill., a corporation of Virginia Application June 12, 1936, Serial No. 84,889
In Germany June 29, 1935

12 Claims. (Cl. 18—57)

This invention relates to methods for treating sausage and like casings; and more particularly to the treatment of casings, composed of cellulose or cellulose derivatives such as cellulose hydrates, for the purpose of imparting a desired curvature thereto.

It is an object of this invention to provide novel methods which are capable of producing curved, seamless, thin-walled sausage casings in a simple and relatively inexpensive manner. These sausage casings may be produced from any desired plastic material as, for example, viscose and other cellulose derivatives which are capable of yielding cellulose hydrate on regeneration, cellulose, protein substances and the like.

It has now been found that the desired curvature can be imparted to straight, longitudinally extended artificial sausage casings formed from plastic material such as, for example, regenerated cellulose by subjecting one side of the casing or tube, while in a distended or inflated form, to an earlier and more intensive drying step than the other. The tube is then subsequently dried at a lower temperature on the other side, conditioned for use, deflated and wound upon a reel or drum in the curved form. As a result of this treatment, the side of the artificial casing which is dried first and more intensively, shrinks permanently and to a greater degree than the other side. In consequence, the casing assumes a permanently curved form which is retained even when moistened with water or when filled with the sausage mixture.

In carrying out the process, the still undried cellulose or cellulose derivative tube, coming from the precipitation and glycerine conditioning baths, is guided spirally over a heated drum. Prior to winding the tube on the heated drum, it is fed between a pair of opposed pressure rolls which pinch the tube, as it passes therebetween, to close the tube passageway. The tube portion which has passed the pressure rolls is inflated with air or with an inert gas, and in its inflated state is conducted spirally over the heated drum. The side of the inflated or distended tube, still in a moist, gelatinous state, in contact with the heated drum is thus subjected to an intense drying heat, while the other side is not dried at all or only to an inconsiderable extent. To increase this differential drying action, the treatment of the tube may be effected in a moist atmosphere; for example, by bringing the heated drum on which the preliminary differential drying step is conducted, into a chamber filled with moisture-laden air. The temperature of the drum may be varied, and it is preferred to use a temperature of the order of 90° to 100° C. to impart the desired permanent shrinking to the heated side of the tube. After one side of the tube has been thus dried, the entire tube is finally dried, suitably in a drying chamber supplied with hot air or gases, for example, of about 60 to 80° C. In this step also the tube, while still in inflated condition, may be guided in a spiral or helix over a drum which may, if desired, be heated. For example, a single drum may be used divided into two sections, of which one is heated, suitably by steam, and the other is unheated.

The drying process may be carried out either as a non-continuous or a continuous operation. In carrying out the operation, as for instance by conducting the still moist gelatinous casing over an elongated mandrel or drum, the latter may suitably be provided with a spiral (helical) groove extending over its entire length. This groove aids in guiding the casing over the roll and also prevents undesirable twisting of the casing.

In operating continuously, the casing, after it leaves the drying chest or chamber, passes between a pair of opposed pressure rolls, which prevent the escape of the air used to inflate it, and is then reeled up. Thus the quantity of gas or air initially used remains continuously in the portion of the casing subjected to drying. In non-continuous operation, the casing likewise passes between a pair of opposed pressure rolls on leaving the drying drum. In reeling up the casing, escape of air or gas from the other end of the casing must be permitted and is controlled so that its pressure is maintained in the portion of the casing present in the drying apparatus.

The inflation of the casing with air or gas is effected before starting the drying process. The quantity of air or gas once enclosed within the casing is permanently maintained therein by means of the pairs of opposed pressure rolls through which the casing passes shortly before running onto the drum and after leaving the drying chamber, so that reinflation is necessary only in case of occasional defects in the casing.

The drying drum or mandrel, as above stated, may be heated by steam or electricity, so that a suitable drying temperature, say about 90–100° C. is attained. Since the casing has been shaped in the drying step as herein described and has assumed a curved form similar to an annulus, it cannot be wound on to the reel in a conventional manner. On the other hand, it is wound with the sides of the individual turns of the casing in juxtaposed relationship and the whole is then pressed together and may be shipped or stored until needed for use.

In the accompanying drawings, different forms of apparatus suitable for carrying out the process are shown.

Referring more particularly to the drawings:

Fig. 1 is a longitudinal sectional view, partly in elevation, of apparatus for carrying out the invention continuously;

Fig. 2 is a transverse sectional view thereof, taken along the line 2—2 of Fig. 1;

Fig. 3 is an enlarged fragmentary sectional view of a modified form of mandrel or roller over which the casing may be conducted;

Fig. 4 is a front elevation of a modified form of our invention which is adapted to form curved sausage casings in an intermittent manner and showing the arrangement of the parts at the start of the operation;

Fig. 5 is a detail view showing one form of heating means for the rotating drum;

Figs. 6 and 7 are views similar to Fig. 4 and the arrangement of the parts during the subsequent stages of the operation; and Fig. 8 is an end view of the apparatus taken along the line 8—8 of Fig. 6 and showing the construction of the carriage mechanism.

Referring to Figs. 1–3, 10 is a reel from which the casing, in a moist, gelatinous state, is unrolled and introduced between a pair of opposed spring pressure rolls 11. The casing is guided through an opening in a chamber 12 and is conducted spirally (helically) over the mandrel of drum 13.

The chamber 12 may suitably be subdivided into two compartments 14 and 15, as by a partition 16. The drum 13 extends within the chamber 12 and is mounted for rotation in suitable bearings. The drum or mandrel 13 may likewise be subdivided into two parts; one of which, 17 is arranged to be heated by any suitable means, such as steam, hot water or electrical resistance, and lies within compartment 14; and the other, 18, remains unheated and lies within compartment 15. Compartment 14 may be designated as the preliminaary drying chamber, and compartment 15 as the final drying chamber. An inlet conduit 19 for steam or the like extends through the unheated section 18 of drum 13 and opens into section 17 of drum 13 to supply steam or other heating medium thereto and thus to effect the desired heating of this drum section. Steam or heating fluid is discharged from section 17 through outlet conduit 20. The chamber 14 may be filled with a circulating current of moist air or inert gas entering through inlet 21 and leaving through outlet 22; and the drying chamber 15 may be filled with a circulating current of heated air or gas entering through inlet 23 and leaving by outlet 24.

Adjacent and below the mandrel or drum 13, there may be provided small rollers 26, suitably slightly inclined, or other suitable guiding means as, for example, fingers, to aid in guiding the casing spirally over the drum; or if desired, the drum may be formed with spiral or helical grooves 25, as in Fig. 3 to guide the casing and thus eliminate the need for the rollers 26. Adjacent the other end of drum 13 a second pair of opposed spring pressure rolls 27 through which the dried casing is arranged to pass are provided. From the pressure rolls 27, the casing is led onto a winding reel 28.

In the operation of the hereinabove described device to continuously treat an elongated length of sausage casing to impart a desired curvature thereto, the moist casing suitably of regenerated cellulose derived from viscose, is pulled from the reel 10 or conducted directly from the precipitation and treating baths and fed between the first pair of pressure rolls 11. The casing is then wound about the drum 13 and the small guide rolls 26, (if the latter are used) and passed between the second pair of pressure rolls 27 and onto the reel 28. Before the casing is led onto reel 28 and with the pressure rolls 27 separated, the portion of the casing on the drum and between the two sets of pressure rolls 11 and 27 is inflated with air or inert gas. The pressure rolls 27 are now pressed together or closed and the air or inert gas in the casing is trapped and held between the two sets of pressure rolls. In operation, the body of air or inert gas retained between the two sets of pressure rolls remains relatively stationary as the casing passes through the apparatus and hence the casing between the two sets of pressure rolls is progressively inflated. In the absence of any breaks in the casing, the amount of air or inert gas originally introduced is sufficient to continuously distend or inflate the casing between the two sets of pressure rolls.

During the passage of the casing through the preliminary drying chamber 14, the inner side of the moist inflated casing in contact with the heated portion 17 of the drum is dried quickly, while the outer side, maintained in the humid atmosphere in chamber 14, is not dried or is dried but little. The quick intense drying of the side of the casing in contact with the heated portion of the drum serves to shrink that side so that the dried casing after final drying assumes a permanently curved form which is maintained even when the casing is moistened or filled with the edible products. The portion of the mandrel in compartment 14 may be heated with steam, as described, but it is apparent that other suitable and well-known heating means may be employed, as for instance, electricity. As hereinbefore stated the heated portion 17 of the drum may be brought to a temperature in the order of 90–100° C. to accomplish the desired shrinking of one side of the casing; however, it is apparent that temperatures somewhat above or below the limits indicated may be employed, if desired.

After the inner side of the casing has thus been preliminarily and intensely dried, the casing passes over the unheated portion 18 of the drum in the chamber 15 wherein the still moist side is dried by the dry heated air or inert gas passing therethrough. This air may suitably be at some desirable drying temperature, as for instance in the order of 40–60° C. The dried tube then passes between the second set of pressure rolls 27 and out of the drying chamber 15 onto the reel 28. As the flattened casing has a curved form, it is wound on the reel with its curved edge in contact with the hub thereof and its flattened sides adjacent one another. The wound casing may be then pressed together, removed from the reel and stored or shipped in that form.

In Figs. 4 to 8 is disclosed apparatus for carrying out our process in a discontinuous or intermittent manner. In this form of the invention a standard or base 30 is provided upon which a movable carriage 31, carrying a heated rotatable drum 32, may be moved longitudinally, being mounted on wheels 33 which are adapted to roll along guides suitably provided on base 30. A rotatable worm screw 35 mounted for rotation on the standard 30 passes through a unit supported on the carriage 31 and is provided with a drive sprocket 36 (Fig. 4) which is driven from any suitable source of power, as by a sprocket chain and motor (not shown). The carriage 31 can thus be moved backward and forward on the frame 30.

The drum 32 is suitably mounted in bearings on carriage 31. The drum 32 is rotated, as by a sprocket chain drive from a source of power such as motor drive 38, mounted on the carriage and adapted to be propelled therewith. The speed of the motor is, of course, regulated to rotate the drum in accordance with the advancing movement of the carriage. The drum 32 is heated for its entire length, and is also provided with stuffing boxes for the introduction of air into the casing wound on the drum for drying. 39 is a drying chamber, which may be supplied with warm air at 39a. The excess air, charged with moisture, may escape at 39b.

The operation of the device of Figs. 4 to 8 is as follows: The parts are initially in the position shown in Fig. 4. The casing is drawn from a relatively stationary rotatable reel 40 through a pair of opposed pressure rollers 41. The free end of the casing, extending through the pressure rolls 41, is connected to a nipple 42 (Fig. 4) which is in communication with a valved air or inert gas inlet 43 through which air or gas is supplied to inflate the casing. The drum is rotated by drive 38 and the worm gear set in motion by drive 36.

The casing is thereby wound in a spiral or helix on drum 32. The casing is inflated and maintained under the desired pressure by the air supplied to its interior through nipple 42. When the winding of the casing on the drum is completed, the end of the casing is severed from the supply reel and the free end inserted on a nipple 44 (Fig. 7). This nipple is connected by a line 45 to a water seal 48 for a purpose to be hereinafter described. The supply of air or gas to the casing may be interrupted by the closing of a valve in inlet line 43.

The part of the inflated casing in contact with the heated drum is rapidly and intensively dried, as in the operation described in connection with Figs. 1 and 2. The drum may be heated by any suitable heating means; for example by electrical resistance, a conventional connection for the purpose being shown in Fig. 5. As the carriage and its associated heated drum carry the first turns of the inflated casing into the heating or drying chamber 39, the side of the casing lying against the drum 32 is already dried and shrunk. In the chamber 39 the drying of the casing is completed. As shown in the drawings, a suitable inlet 39a and outlet 39b for heated air or gas may be provided to heat the chamber. Obviously, any other suitable heating means may be employed.

When the carriage reaches the positions shown in its travel in Fig. 6, the forward end of the drum 32 together with the first turns of the casing has passed almost through the drying chamber and the first portion of the inflated tube is dried and ready for use. When the forward end of the carriage 31 has passed through the drying chamber, the forward end of the casing is detached from the nipple 42, the end inserted between a second pair of opposed pressure rolls 47 and the flattened tube wound on the reel 46 in the further movement of carriage 31 and drum 32. As the casing passes between the pressure rolls 47, the length of inflated casing on drum 32 becomes shorter and in order to permit the air to escape, without change in pressure within the casing, the discharge or escape of air from the casing is effected through the water seal 48, with which the end of the casing has previously been connected, as above described. The pressure can be controlled as desired by the height of the water in the seal.

In the position shown in Fig. 7 the mechanism is shown as it appears at substantially the end of the operation.

In this position, the last turns of the casing have left the drying chamber 39, the casing has been removed from the drum 32 and disconnected from nipple 44 and the whole drum and carrying assembly may travel back at increased speed to its starting position (Fig. 4) and is then ready to dry the next length of casing.

To reduce idle time to a minimum, a second similar device may be built, which is set into operation as soon as the lower drum is empty.

We claim:

1. The method of manufacturing casings for edible products from moist, regenerated cellulose tubing which comprises arranging said tubing in inflated form with a desired curvature drying the side thereof on the inside of the curve while it is in inflated condition by application of a relatively high drying temperature and drying the remainder by application of a substantially lower drying temperature.

2. The process of manufacturing sausage casings in curved or toroidal forms which comprises rapidly drying a moist inflated casing over a portion of its circumference only and subsequently drying the remainder of the casing.

3. The process of manufacturing sausage casings in a curved or toroidal form which comprises rapidly drying a moist inflated casing over a portion of its circumference only in curved form in contact with a heated drum while maintaining the remainder of the casing in a moistened state and subsequently drying the remainder of the casing.

4. The process of manufacturing sausage casings in curved or toroidal form which comprises the step of intensely drying a longitudinally extending section which extends only part-way around a moist inflated casing.

5. The process of manufacturing sausage casings in curved form from regenerated cellulose tubing which comprises subjecting a narrow portion of the circumference of a moist inflated tubing of such material to a high drying temperature and subsequently subjecting the remainder of the tubing to a relatively lower drying temperature.

6. The process of manufacturing curved sausage casings of regenerated cellulosic material which comprises progressively contacting a portion only of the circumference of the tubing of an elongated inflated tubing of moist regenerated cellulose with a curved heated mandrel while circulating a current of a moist gas or vapor about the remaining portion of the circumference and subsequently progressively subjecting the moist portion to a current of a warm gas or vapor.

7. The continuous process of manufacturing sausage casings of regenerated cellulosic material in curved form from a substantially straight elongated, freshly-formed casing which comprises progressively subjecting a portion only of the circumference of the tubing of the moist casing while in an inflated state to an intense drying heat while maintaining the other portion of the circumference in a moist state and subsequently progressively subjecting the other portion of the circumference to a drying heat.

8. The continuous process of manufacturing sausage casings of regenerated cellulosic material in curved form from a continuous, freshly formed tubing of such material which comprises subjecting a portion only of the circumference of the moist casing while in an inflated state to a temperature in the order of 90° to 100° C. while maintaining the other portion of the circumference of the tubing in a gelatinous moist state and subsequently subjecting the other portion of the circumference of the tubing to a temperature in the order of 60–80° C.

9. The process of manufacturing sausage casing of regenerated cellulosic material in curved form which comprises progressively winding a predetermined length of a moist inflated tube of such material on a heated mandrel whereby the portion of the tube on the inside of the curve is subjected to an intense drying heat, and passing the mandrel through a heating chamber whereby the remainder of the tube is dried.

10. Process for the production of artificial ring-shaped tubes, so called "round" casings, particularly of regenerated cellulose, characterized by the fact that the wet, still undried tube, under inflation by air or an inert gas, has that portion of its wall, which subsequently forms the inner portion of the ring shaped tube, dried first and thereafter it is dried to the finished state throughout the remainder of its circumference.

11. Process as set forth in claim 10, characterized by the fact that the still undried tube under inflation is first conducted spirally around a heated roll, and is then, on a roll, respectively subjected to the action of a hot drying air.

12. The process of manufacturing sausage casing of regenerated cellulosic material in curved form which comprises first drying a longitudinally extending section of a wet, still undried tube which is only wide enough to cover less than one-half of the circumference of the tube, and thereafter drying the entire tube to a finished state on all sides.

OTTO SCHNECKO.
BRUNO PARTH.